United States Patent [19]

So et al.

[11] Patent Number: 4,697,869

[45] Date of Patent: Oct. 6, 1987

[54] ATTENUATOR FOR OPTICAL FIBER

[75] Inventors: Vincent C. So; Richard P. Hughes; Paul J. Vella, all of Edmonton, Canada

[73] Assignee: Northern Telecom Limited, Montreal, Canada

[21] Appl. No.: 786,426

[22] Filed: Oct. 11, 1985

[51] Int. Cl.[4] .......................... G02B 6/26; G02B 6/42
[52] U.S. Cl. .................... 350/96.15; 350/96.20
[58] Field of Search ............... 350/96.15, 96.16, 96.20

[56] References Cited

U.S. PATENT DOCUMENTS

| | | | |
|---|---|---|---|
| 4,270,839 | 6/1981 | Cross | 350/96.15 |
| 4,403,152 | 9/1983 | Schmid et al. | 350/96.15 |
| 4,586,783 | 5/1986 | Campbell et al. | 350/96.15 |
| 4,588,296 | 5/1986 | Cahill et al. | 350/96.15 |
| 4,618,212 | 10/1986 | Ludington et al. | 350/96.15 |

Primary Examiner—William L. Sikes
Assistant Examiner—Robert E. Wise
Attorney, Agent, or Firm—John E. Mowle; S. L. Wilkinson

[57] ABSTRACT

An attenuator for an optical fiber has a tapered screw around which the fiber is looped, the fiber engaging within the screw thread. The fiber is held fixed in position by a spring so that as the screw is rotated the radius of curvature of that part of the fiber held against the screw is altered. Light propagating along the fiber is radiated out at the fiber bend, the level of radiation loss depending on the bend radius of curvature. The attentuator elements are mounted within a light-tight box with the fiber terminating at optical connector components mounted within a wall of the housing. The connector components enable rapid insertion of the attenuator into an optical transmission line to provide an accurate reproducible level of attenuation.

11 Claims, 2 Drawing Figures

ATTENUATOR FOR OPTICAL FIBER

This invention relates to a method and apparatus for producing variable reflectionless optical attenuation in an optical fiber.

Optical attenuators are devices which block part of the light passing through an optical fiber. Known fixed optical attenuators use a film of opaque material such as chromic oxide which is coated on the end of one fiber at a junction between contiguous fibers. Although such fixed optical attenuators can be made cheaply and are rugged and reliable for field use, they are not well adapted for use in laboratory, factory and certain outside plant locations where it is required to vary the attenuation inserted into the optical transmission line.

In one known variable optical attenuator described in U.S. Pat. No. 4,364,639, the transmission of a liquid crystal film is varied by varying the magnitude of an electric field applied across the liquid crystal. In another known variable attenuator, a rotatable transparent disc is inserted between spaced fiber ends. The disc has a non uniform attenuating film applied to it. As the disc is rotated, the thickness of the opaque film at a location on the fiber axis is altered. Both of these known attenuators result in reflected light being generated at the attenuator and propagating back along the input fiber. If the attenuator is close to a laser, the reflections may produce reduced laser performance. Moreover the known devices are not particularly rugged for field use.

According to one aspect of the invention, there is provided a variable optical attenuator comprising a curved body having different radii of curvature at different positions on the body, bending means for bending an optical fiber around the body to induce radiation loss therefrom and adjustment means for controllably altering the position of the fiber on the body to alter the fiber radius of curvature at the means for incrementally altering the fiber radius of curvature at the bend to vary optical attenuation in the fiber.

According to another aspect of the invention, there is provided a variable optical attenuator comprising bending means for bending an optical fiber to induce radiation loss therefrom and adjustment means for controllably altering the fiber radius of curvature at the bend to vary optical attenuation in the fiber in which the bending means includes a tapered body around which the fiber passes, a part of the fiber being held against the curved surface of the body by a spring.

Preferably the bending means includes a tapered body around which the fiber passes as a loop, the radius of curvature of the fiber depending on the position of the loop relative to a central axis of the tapered body. The tapered body can be a screw with the fiber looped around and located partly within the screw thread. The adjustment means can include a mounting arrangement enabling the screw to be turned, and a fiber holding arrangement to maintain a fixed tension on the fiber loop so as to keep the fiber located against the tapered body. The mounting arrangement can include a fixed diameter extension of the tapered screw locating in an internally threaded anchor part, and a knob at the head end of the screw. The extension and the tapered screw should have identical pitch.

Preferably the elements of the attenuator are housed within a light-tight housing with respective fiber ends terminating at connector components mounted within a wall of the housing and with the adjustment knob accessible from outside the housing. Alternatively the fiber passes though the wall and is terminated as a pair of fiber pigtails. The attenuator is then inserted into an optical system by splicing.

The tapered screw preferably has a diameter varying within the range 25 to 3 millimeters whereby to set the radius of curvature of the fiber within a range from 12.5 to 1.5 millimeters.

According to yet another aspect of the invention, there is provided a method of varying optical attenuation of a fiber comprising providing a curved body having different radii of curvature at different positions on the body, bending the fiber around the curved body to curve a portion of the optical fiber and thereby induce radiation loss therefrom, and controllably adjusting the position of the fiber on the curved body to alter the curvature of the fiber in contact with the body and so set a desired optical attenuation level within the fiber.

An embodiment of the invention will now be described by way of example with reference to the accompanying drawings in which.

Figure 1:
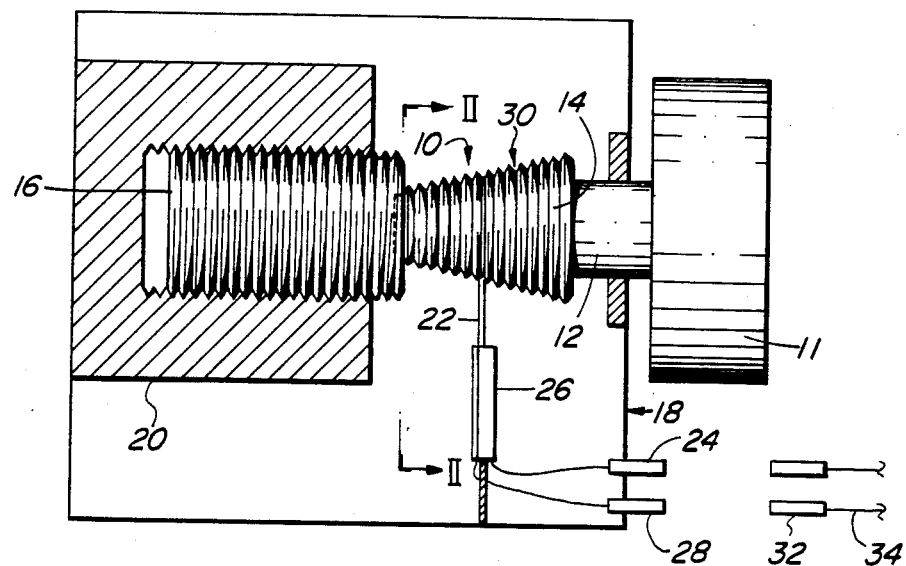
FIG. 1 is a side view of a variable attenuator according to the invention.
Figure 2:
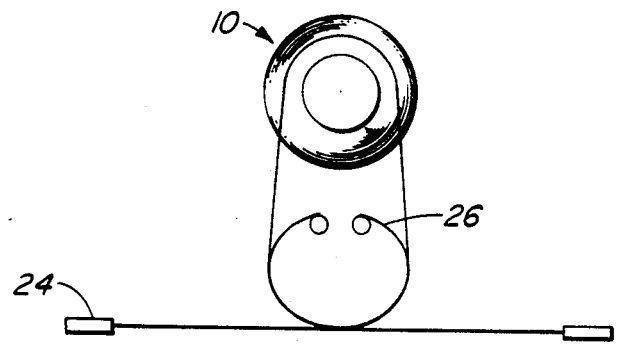
FIG. 2 is a section on the line II—II of FIG. 1.

Referring in detail to FIG. 1, a screw 10 has a knurled head 11, a shank portion 12, a tapered screw part 14 and uniform diameter extension part 16. The shank part 12 is received in an aperture within a wall of a light-tight housing 18. The extension 16 is received in an internally screw threaded supporting block 20 mounted within the housing. The tapered screw part 14 and extension part 16 have identical pitch, the screw being made of Teflon ® coated Invar ®. Extending around the screw at the tapered section 14 is an optical fiber 22 which extends from a first connector part 24, around one part of a flat coil spring 26, around the tapered screw portion 14, around the other part of the coil spring 26 and terminates at a second connector part 28. The coil spring 26 applies a fixed tension to the fiber to maintain the fiber tight within the thread 30 of the tapered screw part.

In operation, to introduce attenuation into a fiber 22, optical connector parts 32 connected to fibers or fiber parts 34 are interconnected to the optical connector parts 24, 28. The screw 10 is then screwed into or out of the supporting block to set the radius of curvature of the internal fiber 22 where it extends in a loop around the tapered screw part 14. It will be understood that since the pitch of the screw extension 16 is identical with that of the tapered screw part 14, and since the fiber 22 is tensioned into the thread 30 of the tapered screw, then as the screw is turned, the position of the fiber 22 relative to the supporting block changes very little.

The light passing through one of the connectors 24, 32 into the fiber is radiated out as the fiber bends around the tapered screw part 14 so that light passing through the other connector 28, 32 is much reduced. The extent of radiation loss is altered by turning the knob 11 according to a scale (not shown) printed on an outside surface of the housing 18 adj.cent to the adjustment knob.

The material of the screw is selected for its temperature stability, ease of accurate machining and strength. The Teflon ® coating is applied to allow smooth slippage of the fiber relative to the screw. In an alternative embodiment (not shown) the section of fiber extending around the screw is enclosed within a length of small bore low friction plastic tubing such as Teflon ® or Tefzel ®. The spring is made of phosphorbronze. The optical connectors are typically of the type available from Dorran Photonics Inc., although particularly for single mode applications, a "wet" connector, which has an index matching gel or liquid allowing connector use with minimal reflection may be used. Such connectors are available from the Deutsch Company.

The choice of a multi- or monomode fiber in the attenuator is determined by the fiber used in the system into which the attenuator is inserted. The fibers must match to avoid prohibitive insertion loss. The radius of the tapered screw part 14, and therefore the radius of curvature of the fiber loop, varies from 12.5 millimeters to 1.5 millimeters. At 12.5 millimeters there is virtually no loss from the fiber and at a 1.5 millimeter radius a loss of about 30 dB is obtained. Although the tapered screw part 14 shown in the illustrated embodiment has a uniform taper greater linearity in the relationship between screw rotation and attenuation may be obtained if the magnitude of the screw taper varies along the length of the screw part 14.

In the embodiment described, a dedicated fiber length is used to introduce fiber attenuation since loss as a function of fiber curvature is fiber specific. However, a more approximate loss can be introduced directly into an optical transmission fiber by bending the fiber using a device in which reproducible fiber curvature can be achieved. In such an embodiment, no input and output connector parts are necessary, but a part of the fiber is clamped in a curved path in such a way as to minimize loss.

In manufacturing an attenuator according to the invention, the device is calibrated by transmitting light at a preset intensity level through the attenuator and measuring the output light intensity as a function of screw position. In a modified version of the attenuator (not shown) a photodetector is housed within 18 so as to intercept light radiated from the curved fiber part. The photodetector output is then used to compensate for deterioration in attenuator accuracy.

What is claimed is:

1. A variable optical attenuator comprising a curved body having different radii of curvature at different positions on the body, bending means for bending an optical fiber around the body to induce radiation loss therefrom and adjustment means for controllably altering the position of the fiber on the body to alter the fiber radius of curvature at the bend to vary optical attenuation in the fiber.

2. An attenuator as claimed in claim 1 wherein elements of the attenuator are housed within a light-tight housing.

3. An attenuator as claimed in claim 2 wherein ends of the fiber terminate at respective connector components mounted within a wall of the housing thereby enabling connection of the attenuator within an optical transmission line.

4. An attenuator as claimed in claim 2 wherein ends of the fiber pass through a wall of the housing to terminate as accessible fiber pigtails.

5. A variable optical attenuator comprising bending means for bending an optical fiber to induce radiation loss therefrom and adjustment means for controllably altering the fiber radius of curvature at the bend to vary optical attenuation in the fiber in which the bending means includes a tapered body around which the fiber passes, a part of the fiber being held against the curved surface of the body by a spring.

6. An attenuator as claimed in claim 5 in which the tapered body is shaped as a right cone.

7. An attenuator as claimed in claim 6 in which the tapered body is a screw, said fiber part locating within a part of the screw thread.

8. An attenuator as claimed in claim 7 in which the screw comprises a tapered screw portion and a threaded fixed diameter co-axial extension engaged within an internally threaded anchor part, the extension and the tapered screw portion having identical pitch.

9. An attenuator as claimed in claim 7 wherein the tapered screw has a radius varying from 12.5 to 1.5 millimeters.

10. An attenuator as claimed in claim 7 wherein elements of the attenuator are housed within a light-tight housing and the screw has a portion projecting through the housing to permit rotation of the screw from outside the housing.

11. A method of varying optical attenuation of a fiber comprising providing a curved body having different radii of curvature at different positions on the body, bending the fiber around the curved body to curve a portion of the optical fiber and thereby induce radiation loss therefrom, and controllably adjusting the position of the fiber on the curved body to alter the curvature of the fiber in contact with the body and so set a desired optical attenuation level within the fiber.

* * * * *